(12) United States Patent
Baek et al.

(10) Patent No.: US 11,510,104 B2
(45) Date of Patent: Nov. 22, 2022

(54) METHOD OF TRANSMITTING DATA AND APPARATUS THEREOF

(71) Applicant: LG ELETRONICS INC., Seoul (KR)

(72) Inventors: Jongseob Baek, Seoul (KR); Woosuk Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 50 days.

(21) Appl. No.: 17/252,121

(22) PCT Filed: Jun. 28, 2018

(86) PCT No.: PCT/KR2018/007340
§ 371 (c)(1),
(2) Date: Dec. 14, 2020

(87) PCT Pub. No.: WO2020/004688
PCT Pub. Date: Jan. 2, 2020

(65) Prior Publication Data
US 2021/0258830 A1    Aug. 19, 2021

(51) Int. Cl.
*H04W 28/08* (2009.01)
*H04W 28/02* (2009.01)
*H04W 4/40* (2018.01)
*H04W 72/12* (2009.01)

(52) U.S. Cl.
CPC .......... *H04W 28/085* (2013.01); *H04W 4/40* (2018.02); *H04W 28/0252* (2013.01); *H04W 28/0289* (2013.01); *H04W 72/1242* (2013.01)

(58) Field of Classification Search
CPC . H04W 28/00; H04W 28/02; H04W 28/0231; H04W 28/0236; H04W 28/085; H04W 28/0252; H04W 28/0289; H04W 4/40; H04W 72/1242; H04W 72/1247; H04W 72/02

See application file for complete search history.

(56) References Cited

U.S. PATENT DOCUMENTS

| | | | |
|---|---|---|---|
| 9,743,314 B2 | 8/2017 | Paredes Cabrera | |
| 2011/0085455 A1 | 4/2011 | Wu et al. | |
| 2017/0272971 A1 | 9/2017 | Boban | |
| 2018/0048577 A1* | 2/2018 | Gulati | H04L 47/12 |
| 2019/0200366 A1* | 6/2019 | Park | H04W 72/085 |
| 2019/0215801 A1* | 7/2019 | Mok | H04L 5/0058 |
| 2020/0045719 A1* | 2/2020 | Wang | H04W 72/048 |
| 2020/0053018 A1* | 2/2020 | White | H04L 47/2441 |
| 2020/0196310 A1* | 6/2020 | Tang | H04W 72/0486 |

(Continued)

FOREIGN PATENT DOCUMENTS

| | | |
|---|---|---|
| KR | 101170847 | 8/2012 |
| KR | 1020150136406 | 12/2015 |

*Primary Examiner* — Robert C Scheibel
(74) *Attorney, Agent, or Firm* — Dentons US LLP

(57) ABSTRACT

Disclosed is a data transmission method of a V2X communication device. A data transmission method of a V2X communication device according to an embodiment of the present invention comprises the steps of: acquiring CBR values for a plurality of channels; configuring a CBR threshold value on the basis of the CBR values; assigning at least one channel candidate group to channels having CBR values that are equal to or smaller than the CBR threshold value; and selecting a transmission channel, through which service data is to be transmitted, from the at least one channel candidate group.

12 Claims, 13 Drawing Sheets

(56) References Cited

U.S. PATENT DOCUMENTS

| | | | |
|---|---|---|---|
| 2020/0267523 A1* | 8/2020 | Tang | H04L 5/001 |
| 2020/0280960 A1* | 9/2020 | Liu | H04L 5/001 |
| 2020/0413443 A1* | 12/2020 | Xing | H04W 76/14 |
| 2021/0250908 A1* | 8/2021 | Baek | H04W 72/02 |
| 2022/0086805 A1* | 3/2022 | Zhang | H04W 74/0808 |

\* cited by examiner

[Figure 1]
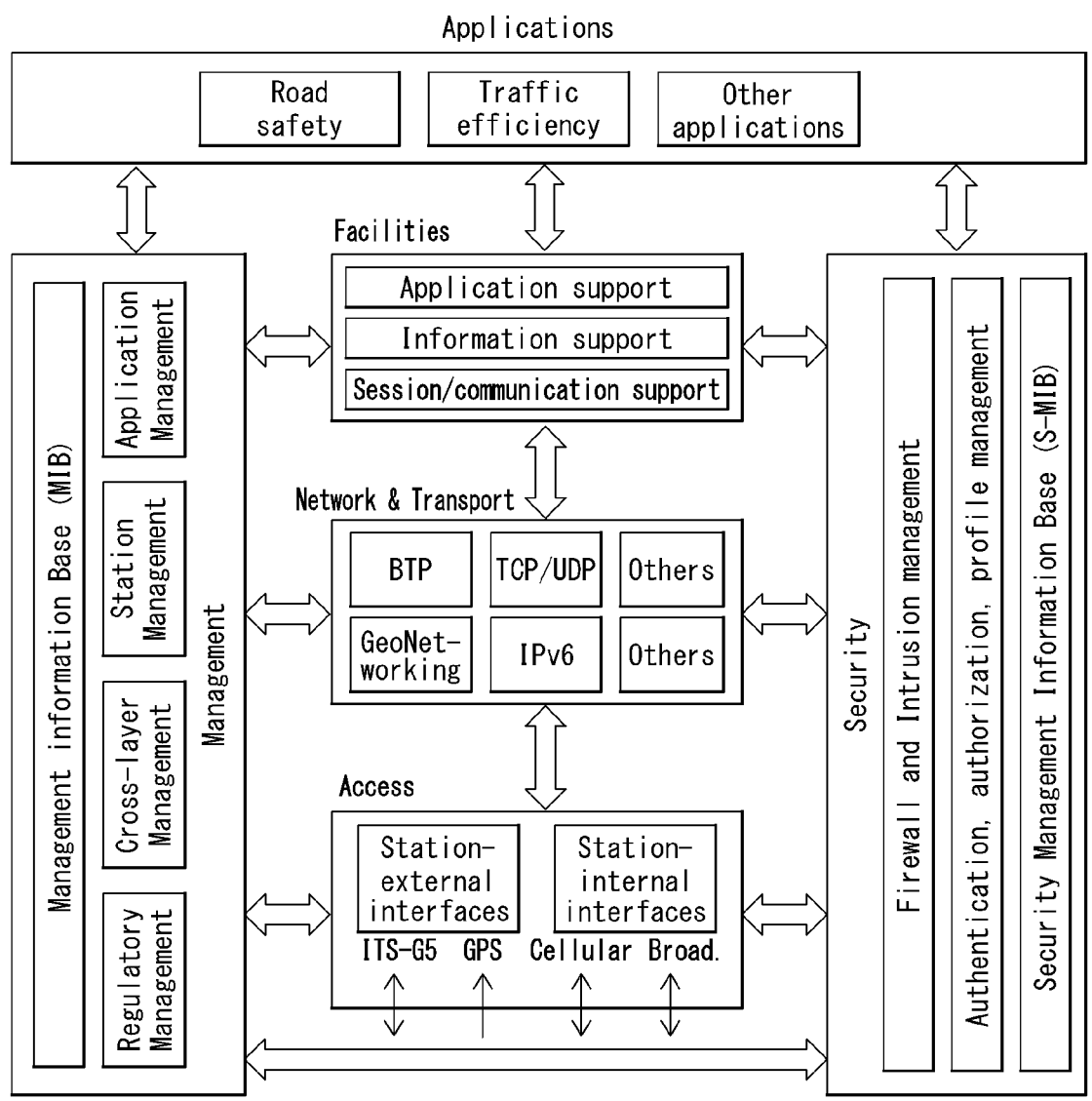

【Figure 2】
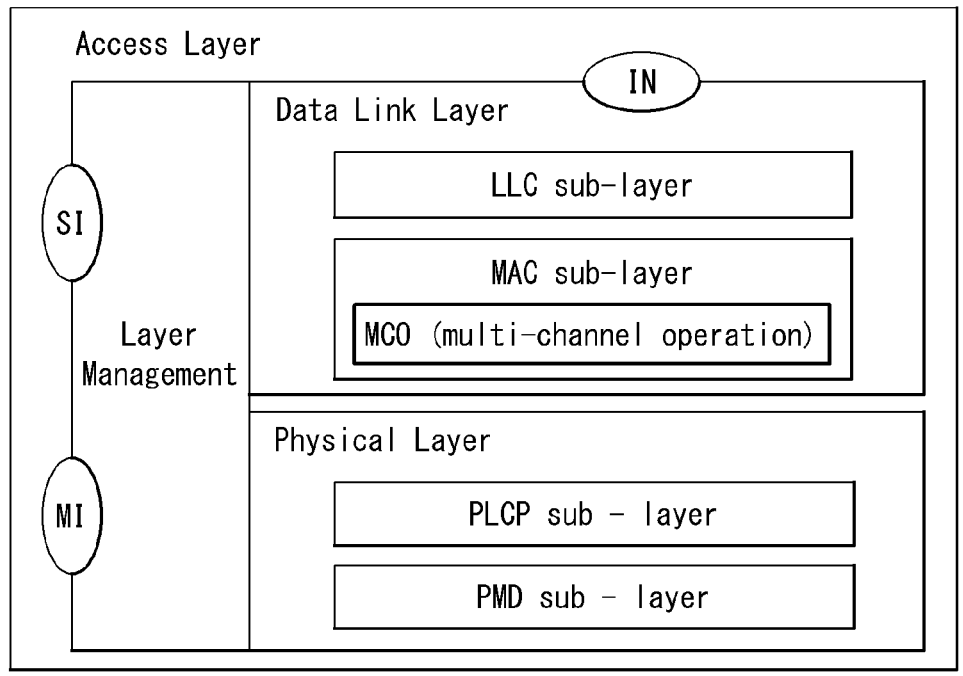

【Figure 3】
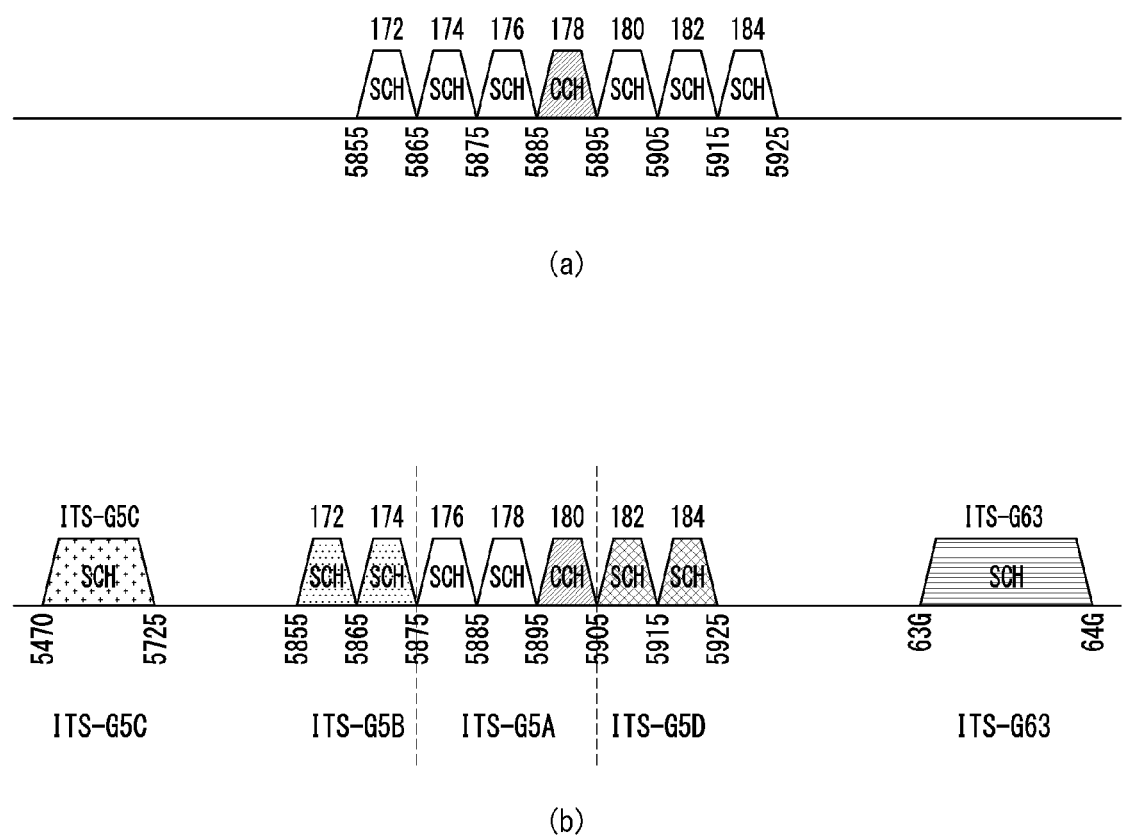

[Figure 4]
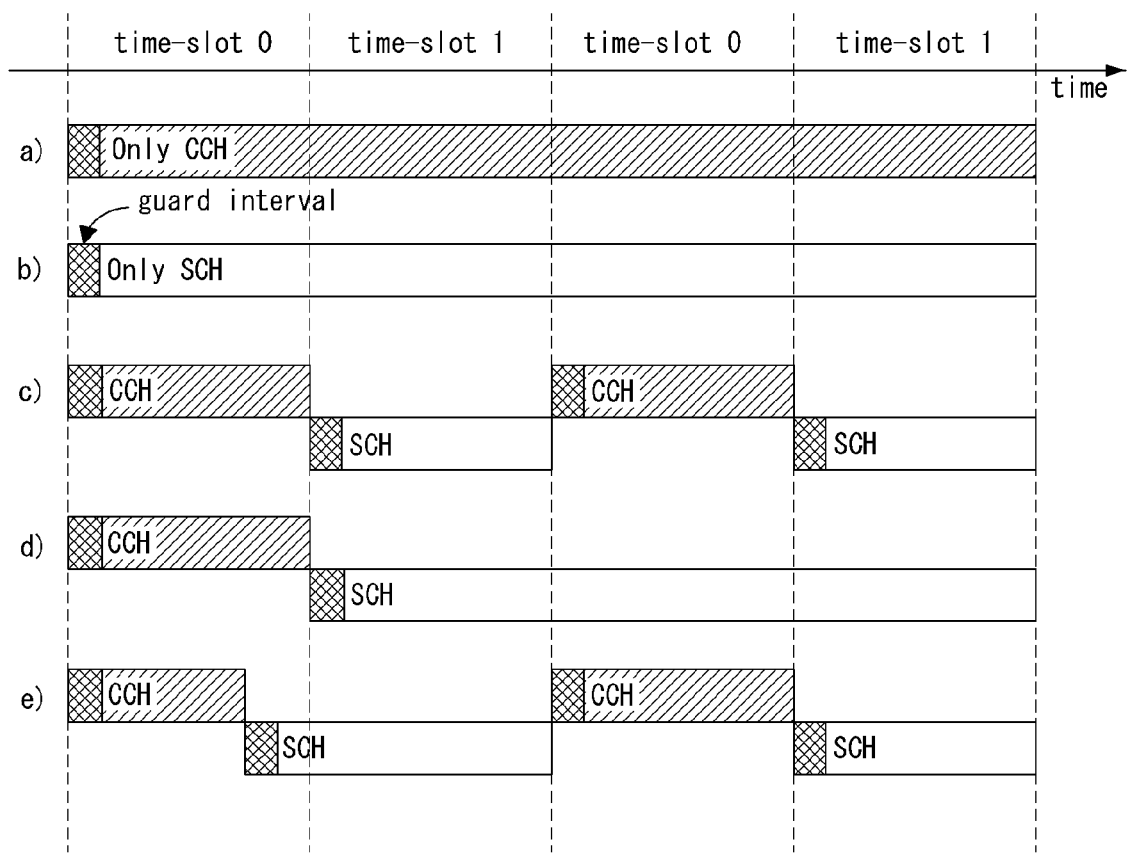

[Figure 5]
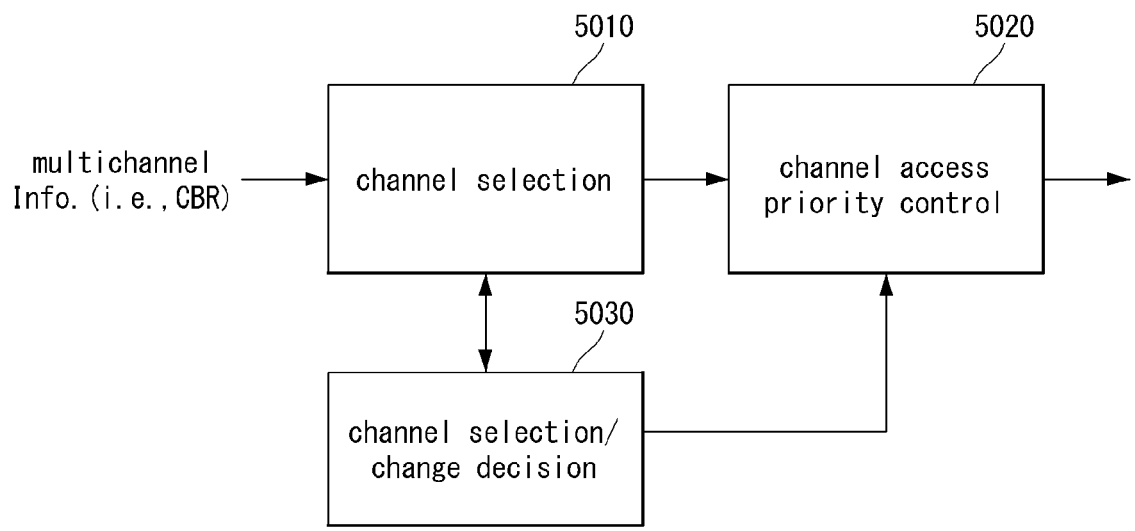

[Figure 6]
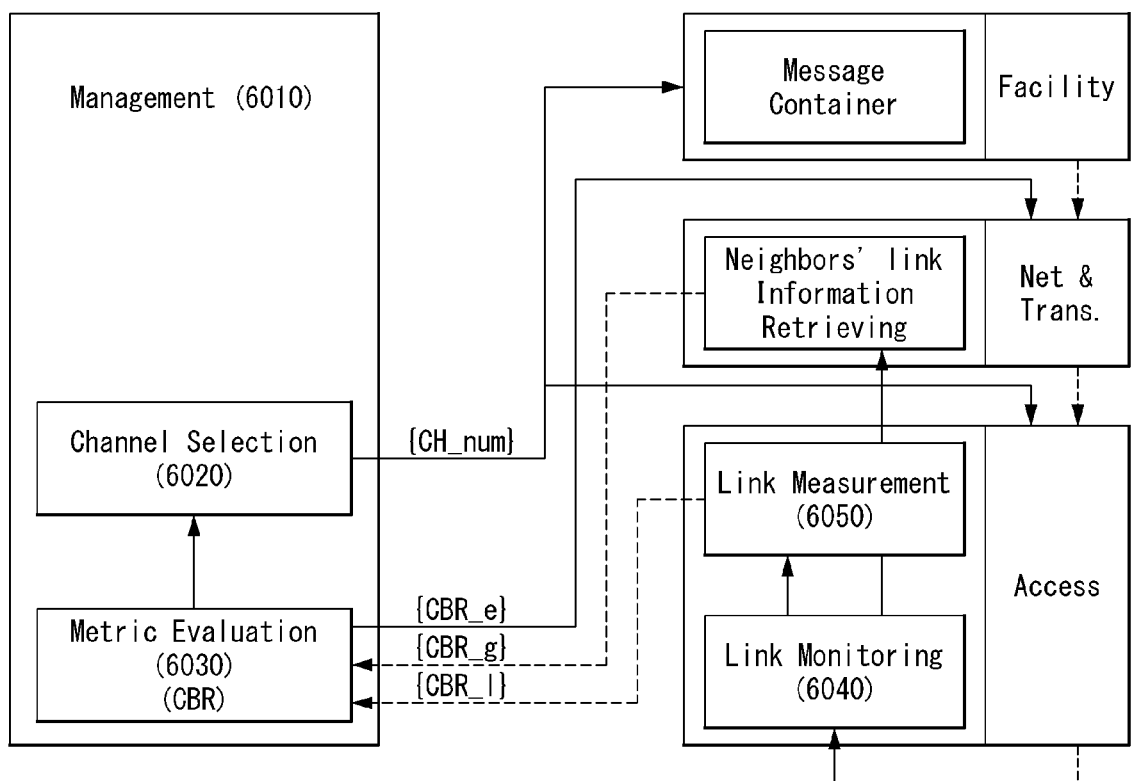
CBR_e: estimated CBR
CBR_g: global CBR
CBR_l: local CBR

[Figure 7]
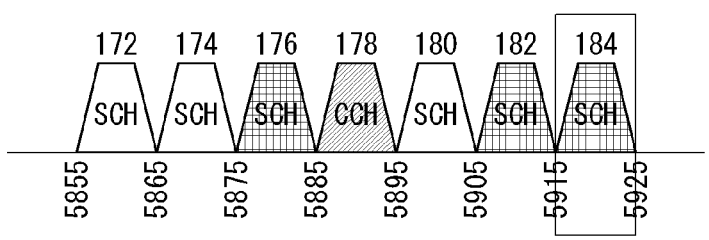

[Figure 8]
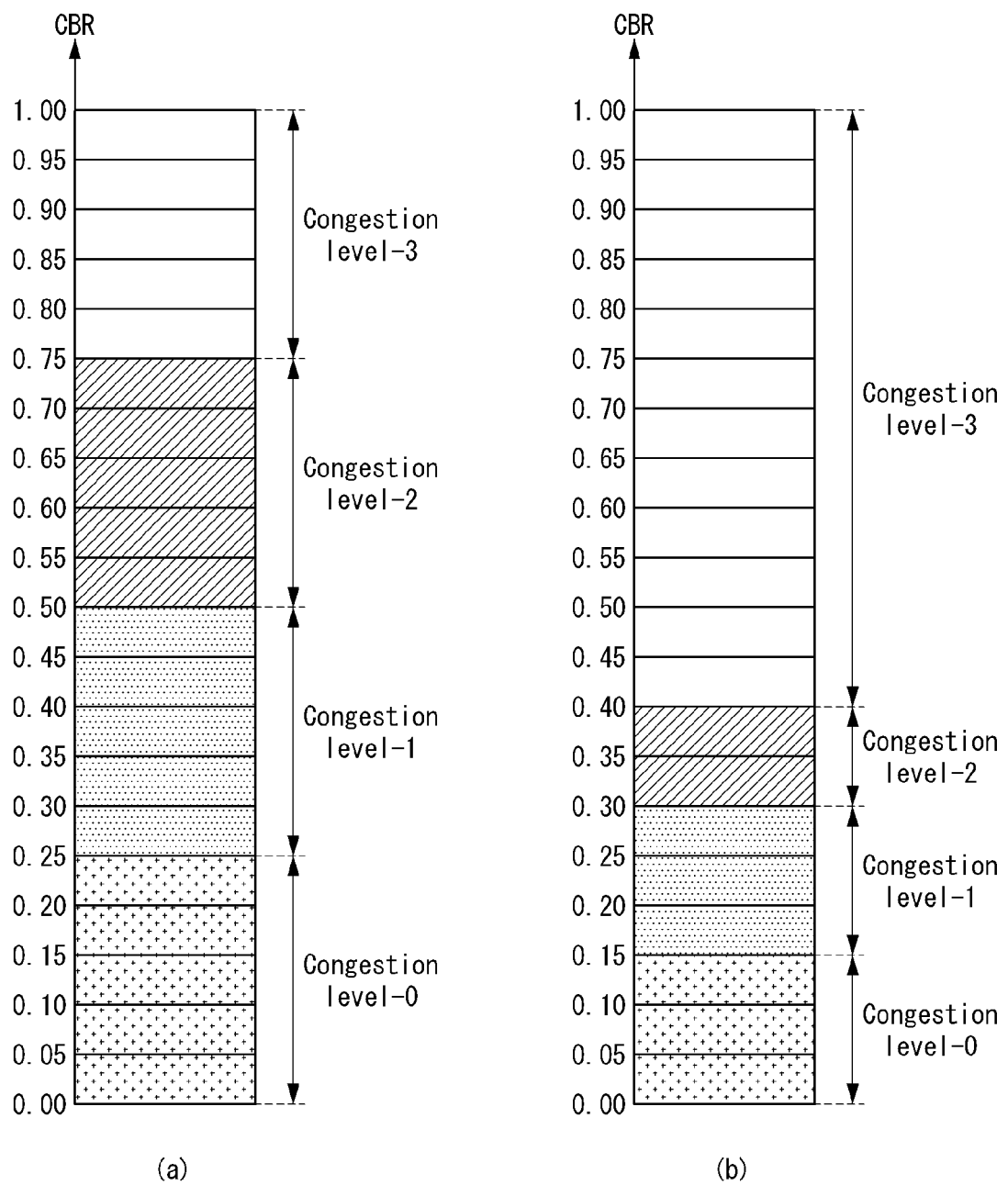

[Figure 9]
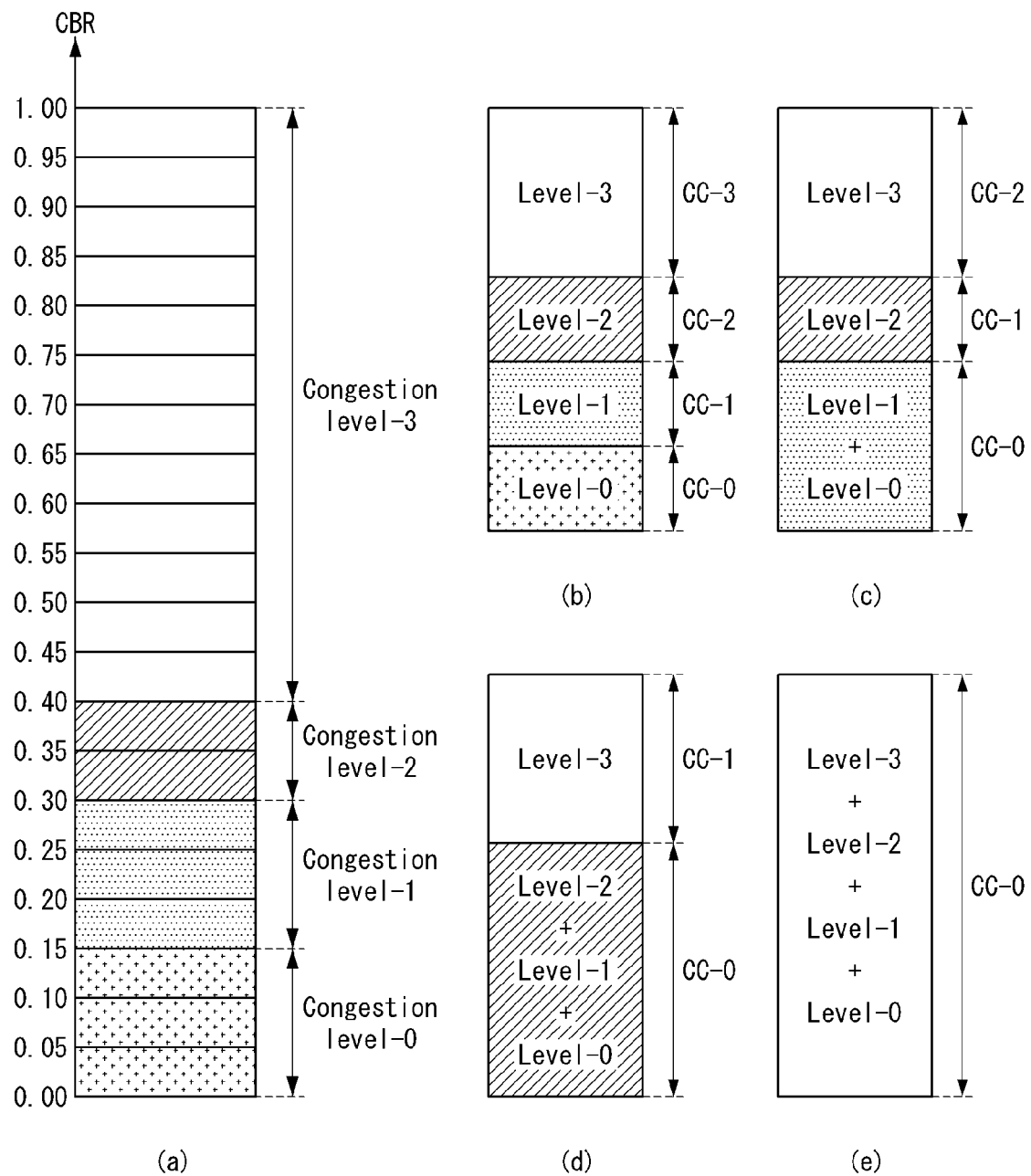

[Figure 10]
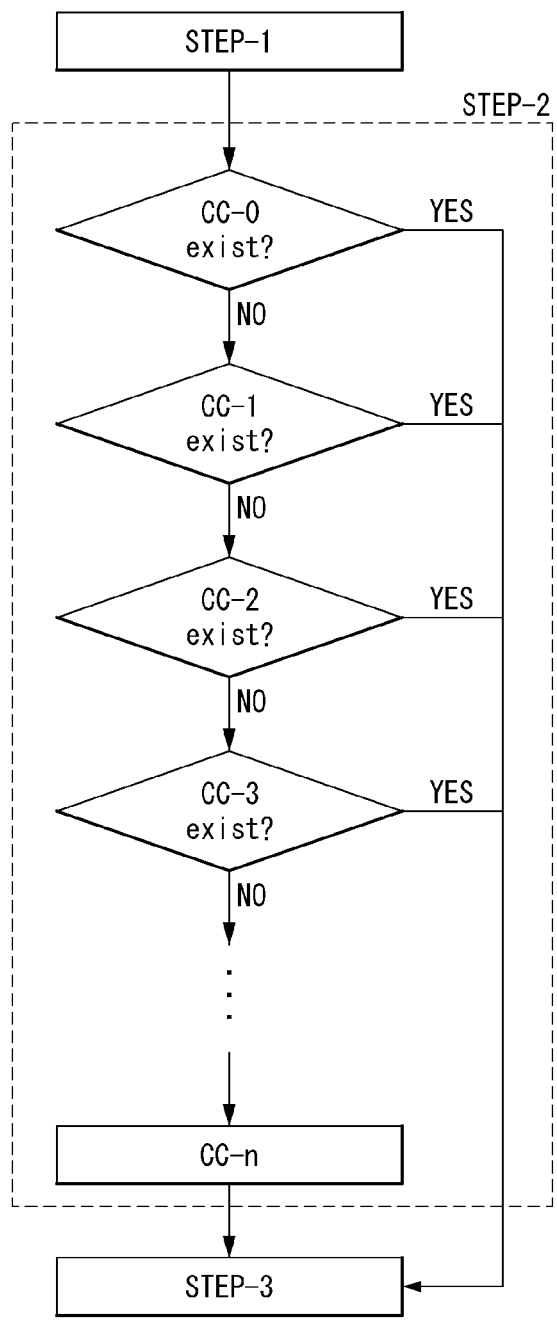

[Figure 11]
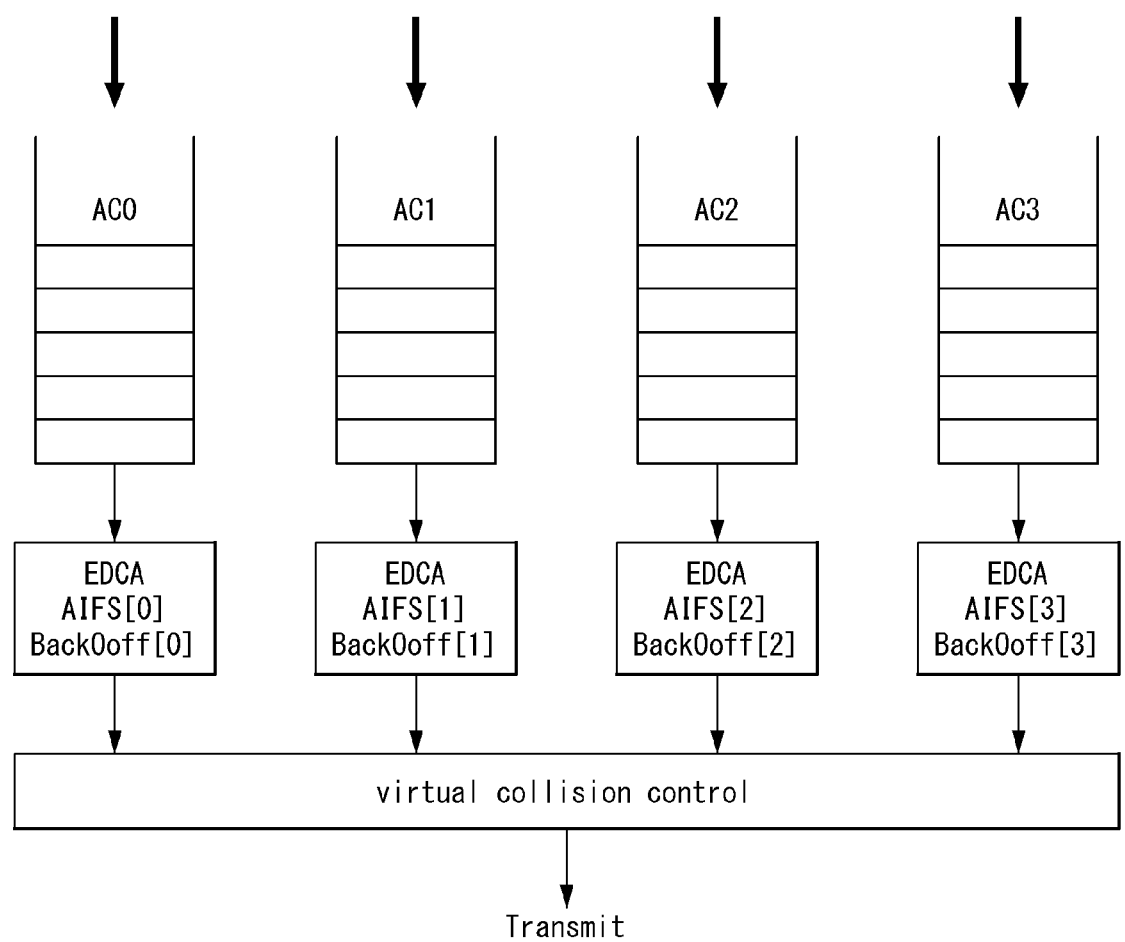

[Figure 12]
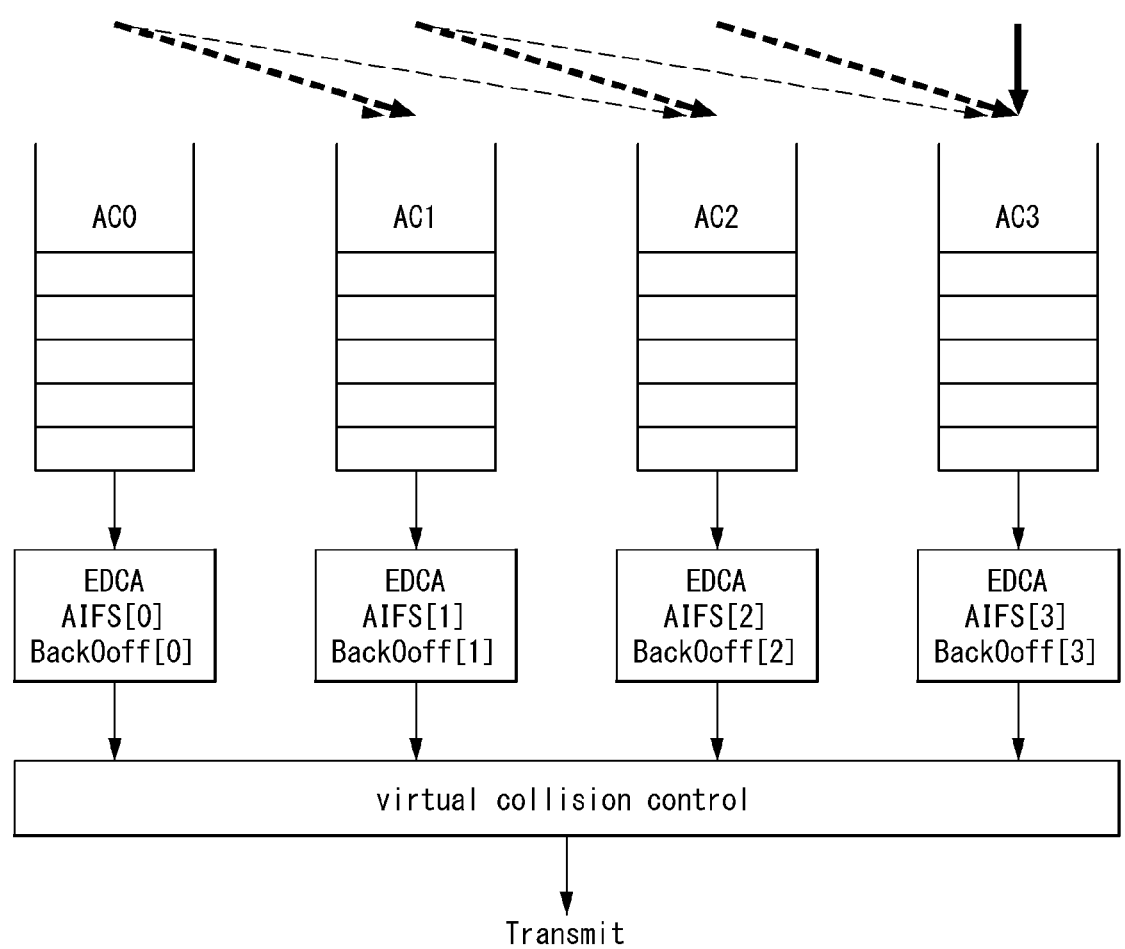

【Figure 13】
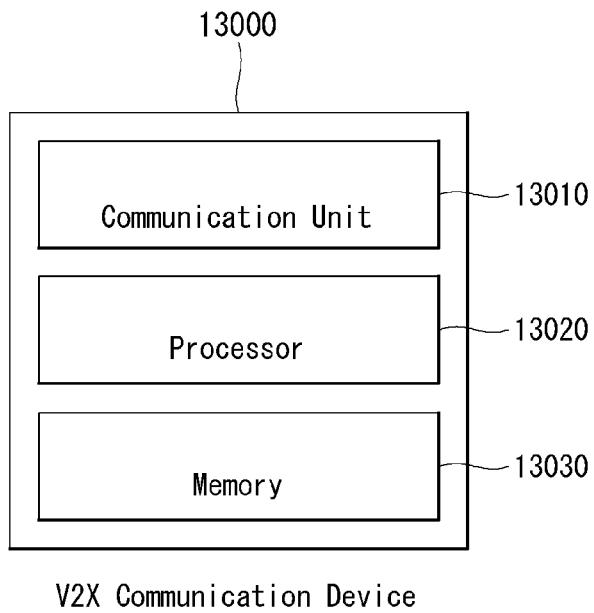
V2X Communication Device
【Figure 14】
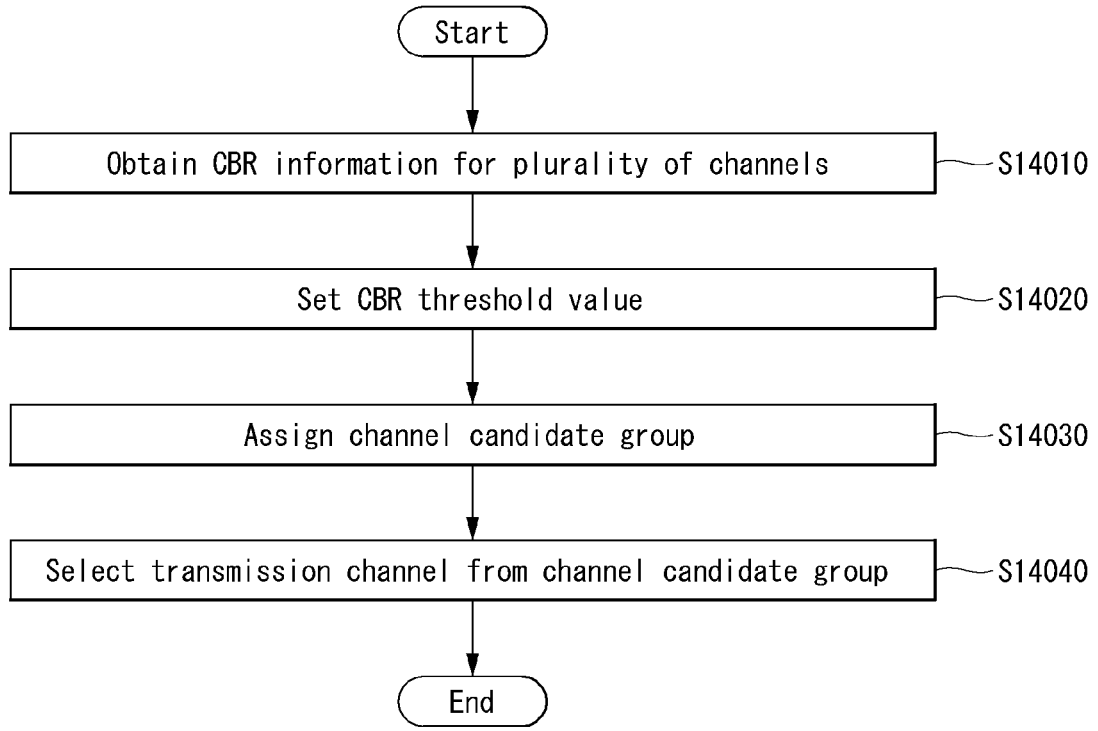

METHOD OF TRANSMITTING DATA AND APPARATUS THEREOF

This application is the National Stage filing under 35 U.S.C. 371 of International Application No. PCT/KR2018/007340, filed on Jun. 28, 2018, the contents of which are all hereby incorporated by reference herein in their entirety.

TECHNICAL FIELD

The present disclosure relates to a device for V2X communication and a method of transmitting data and, more particularly, to a method of determining a transmission channel from a channel candidate group using a CBR value for multiple channels.

BACKGROUND ART

Recently, a vehicle has become an output of complex industry technology in which electric, electronic and communication technologies are converged out of a mechanical engineering base. In this aspect, the vehicle is also called a smart car. The smart car has become provided various user-customized mobile services as well as the vehicle technology having a traditional meaning, such as traffic safety/congestion solution by connecting a driver, vehicle, transportation infra, etc. Such connectivity may be implemented using a vehicle to everything (V2X) communication technology. Connectivity may be implemented various V2X communication technologies, such as Europe ITS-G5, U.S. WAVE, and a new radio (NR). NR may include new communication technology between vehicles including cellular V2X, such as LTE-V2X and 5G-V2X which are developed in the future.

DISCLOSURE

Technical Problem

Various services can be provided through V2X communication. Furthermore, a plurality of frequency bands was used to provide the various services. Even in such an environment, highly reliable forwarding and providing of safety services are very important matters considering characteristics of vehicle communication.

In particular, in a multi-channel environment, a V2X communication device has to select a channel in which data will be transmitted. It is a very important problem to select a channel having a small channel load from the nature of V2X communication whose latency is fatal.

Technical Solution

In order to solve the aforementioned technical problems, a method of transmitting, by a V2X communication device, data according to an embodiment of the present disclosure includes obtaining CBR values for a plurality of channels; setting a CBR threshold value based on the CBR values; assigning, as at least one channel candidate group, channels each having a CBR value smaller than or equal to the CBR threshold value; and selecting a transmission channel in which service data is to be transmitted from the at least one channel candidate group.

In the method of transmitting, by a V2X communication device, data according to an embodiment of the present disclosure, selecting, from the at least one channel candidate group, a transmission channel in which service data is to be transmitted further includes selecting, from the at least one channel candidate group, a channel candidate group having a lowest CBR covered by a CBR window; and selecting the transmission channel among channels selected in the channel candidate group.

In the method of transmitting, by a V2X communication device, data according to an embodiment of the present disclosure, the number of at least one channel candidate group and a CBR window covered by each of the channel candidate groups may be differently set based on service priority of the service data.

In the method of transmitting, by a V2X communication device, data according to an embodiment of the present disclosure, as the service priority becomes higher, the number of channel candidate groups may be increased and the CBR window covered by the channel candidate group may be narrowed, and as the service priority becomes lower, the number of channel candidate groups may be decreased and the CBR window covered by the channel candidate group may be widened.

In the method of transmitting, by a V2X communication device, data according to an embodiment of the present disclosure, if the service data is transmitted in a secondary channel not a primary channel for the service, priority for queue assignment to the service data may be temporarily changed.

In the method of transmitting, by a V2X communication device, data according to an embodiment of the present disclosure, if the service data is transmitted in a secondary channel not a primary channel for the service, the service data may be input to a queue corresponding to an access category lower than an access category assigned to the service.

In the method of transmitting, by a V2X communication device, data according to an embodiment of the present disclosure, the channel candidate group may be determined based on a channel congestion level for the service.

In the method of transmitting, by a V2X communication device, data according to an embodiment of the present disclosure, a change in the transmission channel may be determined based on an allowable channel congestion level or the threshold value of the CBR values for the plurality of channels.

In order to solve the aforementioned technical problems, a V2X communication device according to an embodiment of the present disclosure includes a memory storing data; an RF unit transmitting and receiving radio signals; and a processor configured to control the memory and the RF unit. The processor may be configured to obtain CBR values for a plurality of channels, set a CBR threshold value based on the CBR values, assign, as at least one channel candidate group, channels each having a CBR value smaller than or equal to the CBR threshold value, and select a transmission channel in which service data is to be transmitted from the at least one channel candidate group.

Advantageous Effects

According to the present disclosure, when data is transmitted, a channel load can be distributed because a data transmission channel is determined based on a CBR value.

Service priority may be considered in a channel determination. According to the present disclosure, priority is incorporated into a channel candidate group. Accordingly, a service having high priority can be transmitted more effectively. That is, a probability that a service having high priority will be transmitted in a channel having a lower CBR value is increased.

Generally, according to the present disclosure, a channel/resource can be efficiently used when data is transmitted, and latency can be reduced when data is transmitted.

DESCRIPTION OF DRAWINGS

The accompanying drawings, which are included herein as a part of the description to help understanding the present disclosure, provide embodiments of the present disclosure and describe the technical features of the present disclosure with the description below.

FIG. 1 illustrates reference architecture of an intelligent transport system (ITS) station according to an embodiment of the present disclosure.

FIG. 2 illustrates an ITS access layer according to an embodiment of the present disclosure.

FIG. 3 illustrates multi-channel allocation used for an ITS system operation according to an embodiment of the present disclosure.

FIG. 4 illustrates a channel coordination mode of multi-channel operation according to an embodiment of the present disclosure.

FIG. 5 illustrates logical blocks of a multi-channel operation method according to an embodiment of the present disclosure.

FIG. 6 illustrates an operation structure between layers for channel selection according to an embodiment of the present disclosure.

FIG. 7 illustrates a secondary channel selection method according to an embodiment of the present disclosure.

FIG. 8 illustrates a channel classification method based on a channel congestion level according to an embodiment of the present disclosure.

FIG. 9 illustrates a method of configuring channel candidate groups in which service priority is considered according to an embodiment of the present disclosure.

FIG. 10 illustrates a channel candidate group selection process according to an embodiment of the present disclosure.

FIG. 11 illustrates an EDCA queue structure of a MAC layer of a V2X communication device according to an embodiment of the present disclosure.

FIG. 12 illustrates an EDCA queue control method of the MAC layer of the V2X communication device according to an embodiment of the present disclosure.

FIG. 13 illustrates the V2X communication device according to an embodiment of the present disclosure.

FIG. 14 is a flowchart illustrating a multi-channel transmission method of the V2X communication device according to an embodiment of the present disclosure.

BEST MODE

Preferred embodiments of the disclosure will be described in detail with reference to the accompanying drawings. The following detailed description with reference to the attached drawings illustrates preferred embodiments of the disclosure rather than illustrating only embodiments that may be implemented according to embodiments of the disclosure. The following detailed description includes details in order to provide a thorough understanding of the disclosure, but the disclosure does not require all of these details. In the disclosure, embodiments described hereinafter are not intended to be respectively used independently. Multiple embodiments or all embodiments may be used together, and specific embodiments may be used in combination.

Most of terms used in the disclosure are selected from general ones widely used in the art, but some terms are optionally selected by an applicant and meanings thereof are described in detail in the following description as needed. Accordingly, the disclosure should be understood based on the intended meaning of the term rather than a simple name or meaning of the term.

The disclosure relates to a V2X communication device, and the V2X communication device may be included in an Intelligent Transport System (ITS) to perform all or some of functions of the ITS system. The V2X communication device may perform communication with a vehicle and a vehicle, a vehicle and an infrastructure, a vehicle and a bicycle, and mobile devices. The V2X communication device may be abbreviated to a V2X device. In an embodiment, the V2X device may correspond to an On Board Unit (OBU) of a vehicle or may be included in an OBU. The V2X device may correspond to a Road Side Unit (RSU) of an infrastructure or may be included in an RSU. Alternatively, the V2X communication device may correspond to an ITS station or may be included in an ITS station. In an embodiment, the V2X device may operate in a Wireless Access In Vehicular Environments (WAVE) system of IEEE 1609.1 to 4.

FIG. 1 illustrates reference architecture of an Intelligent Transport System (ITS) station according to an embodiment of the disclosure.

In the architecture of FIG. 1, two end vehicles/users may communicate with a communication network, and such communication may be performed through a function of each layer of the architecture of FIG. 1. For example, when a message between vehicles is communicated, in a transmitting vehicle and an ITS system thereof, by passing through each layer below one layer, data may be transferred, and in a receiving vehicle and an ITS system thereof, by passing through each layer above one layer, data may be transferred. A description of each layer of the architecture of FIG. 1 is as follows.

Application layer: the application layer may implement and support various use cases. For example, the application may provide road safety, efficient traffic information, and other application information.

Facilities layers: the facilities layer may support to effectively realize various use cases defined at the application layer. For example, the facilities layer may perform application support, information support, and session/communication support.

Networking & Transport layer: the networking/transport layer may constitute a network for vehicle communication between homogenous/heterogenous networks by using various transport protocols and network protocols. For example, the networking/transport layer may provide Internet access and routing using an Internet protocol such as TCP/UDP+IPv6. Alternatively, the networking/transport layer may constitute a vehicle network using a geographical position based protocol such as Basic Transport Protocol (BTP)/GeoNetworking.

Access layer: the access layer may transmit a message/data received from a superordinate layer through a physical channel. For example, the access layer may perform/support data communication based on IEEE 802.11 and/or 802.11p standard based communication technology, ITS-G5 wireless communication technology based on IEEE 802.11 and/or 802.11p standard physical transmission technology, 2G/3G/4G(LTE)/5G wireless cellular communication technology including satellite/broadband wireless mobile communication, broadband terrestrial digital broadcasting technology such as DVB-T/T2/ATSC, GPS technology, and IEEE 1609 WAVE technology.

ITS architecture may further include a management layer and a security layer.

FIG. 2 illustrates an ITS access layer according to an embodiment of the disclosure.

FIG. 2 illustrates in more detail the ITS Access Layer of the ITS system of FIG. 1. The access layer of FIG. 2 may include a data link layer, a physical layer, and layer management. The access layer of FIG. 2 has characteristics similar to or identical to an OSI 1 layer (physical layer) and an OSI 2 layer (data link layer).

The data link layer may include a Logical Link Control (LLC) sub-layer, a Medium Access Control (MAC) sub-layer, and a Multi-channel operation (MCO) sub-layer. The physical layer may include a Physical Layer Convergence Protocol (PLCP) sub-layer and a Physical Medium Access (PMD) sub-layer.

In order to enable a superordinate network layer to use a physical line between adjacent nodes (or between vehicles) having noise, the data link layer may convert the physical line into a communication channel having no transmission error. The data link layer performs a function of transmitting/transporting/transferring a 3-layer protocol, a framing function of dividing and grouping data to transmit into a packet (or frame) as a transmission unit, a flow control function of compensating a speed difference between the sending side and the receiving side, and a function of detecting and modifying or retransmitting a transmission error. Further, the data link layer performs a function of giving a sequence number to a packet and an ACK signal in order to avoid to erroneously confuse the packet or the ACK signal and a function of controlling setting, maintaining, short-circuit, and data transmission of a data link between network entities. Furthermore, such a data link layer may include a logical link control (LLC) sub-layer and a medium access control (MAC) sub-layer based on IEEE 802 standard.

A main function of the LLC sub-layer is to enable to use several different sub-MAC sub-layer protocols to allow communication unrelated to topology of a network.

The MAC sub-layer may control occurrence of collision/contention between vehicles when several vehicles (or nodes or a vehicle and peripheral devices) use a shared medium. The MAC sub-layer may format a packet transferred from a superordinate layer to correspond to a frame format of the physical network. The MAC sub-layer may perform addition and identification functions of a sender address/recipient address, carrier detection, collision detection, and fault detection on a physical medium.

The physical layer: the physical layer may define an interface between a node and a transmission medium to a lowest layer on an ITS layer structure and perform modulation, coding, and mapping of a transmission channel to a physical channel for bit transmission between data link layer entities. Further, the physical layer performs a function of notifying the MAC sub-layer whether a wireless medium is being used (busy or idle) through carrier sense and clear channel assessment (CCA). Furthermore, such a physical layer may include a physical layer convergence protocol (PLOP) sub-layer and a physical medium access (PMD) sub-layer based on IEEE standard.

The PLOP sub-layer performs a function of connecting a data frame with the MAC sub-layer. By attaching a header to the received data, the PLOP sub-layer enables to operate the MAC sub-layer regardless of physical characteristics. Therefore, in the PLOP frame, a format thereof may be defined differently according to various different wireless LAN physical layer standards.

A main function of the PMD sub-layer may perform carrier/RF modulation of frames received from the PLOP sub-layer and then transmit the frames to a wireless medium according to transmission and reception transmission related standards.

Layer management performs a function of managing and servicing information related to an operation and security of an access layer. Information and service are bilaterally transferred and shared through MI (interface between management entity and access layer or MI-SAP) and SI (interface between security entity and access layer or SI-SAP). Two-way information and service transfer between the access layer and a network/transport layer is performed by IN (or IN-SAP).

The MCO sub-layer may provide various services such as a safety service and other services, i.e., a non-safety service other than the safety service using a plurality of frequency channels. By effectively distributing a traffic load in a particular frequency channel to other channels, the MCO sub-layer may minimize collision/contention when communicating between vehicles in each frequency channel. The MCO sub-layer may perform multi-channel access and operation to be described hereinafter based on setting received from the superordinate layer.

FIG. 3 illustrates multi-channel allocation used for an ITS system operation according to an embodiment of the disclosure.

FIG. 3(a) illustrates US spectrum allocation for an ITS, and FIG. 3(b) illustrates EP spectrum allocation for an ITS.

As shown in FIG. 3, the United States and Europe have seven frequencies (each frequency bandwidth: 10 MHz) in 5.9 GHz band (5.855 to 5.925 GHz). Seven frequencies may include one CCH and 6 SCHs. As shown in FIG. 3(a), in the United States, the CCH is allocated to a channel number 178 and as shown in FIG. 3(b), in European, the CCH is allocated to a channel number 180.

In Europe, in order to provide a service that is time-sensitive and having a large data capacity, it is considered to additionally use an ITS-G63 band in a superordinate frequency band based on 5.9 GHz and it is considered to use an ITS-G5 band in a subordinate frequency band. In order to provide a high quality of service by appropriately allocating the service to various multi-channels in such an environment, development of an efficient multi-channel operation method is required.

The CCH indicates a radio channel used for exchange of a management frame and/or a WAVE message. The WAVE message may be a WAVE short message (WSM). The SCH is a radio channel used for providing a service and represents a random channel instead of the CCH. In an embodiment, the CCH may be used for communication of a Wave Short Message Protocol (WSMP) message or communication of a system management message such as a WAVE Service Advertisement (WSA). The SCH may be used for general-purpose application data communication, and communication of such general-purpose application data may be coordinated by service related information such as the WSA.

Hereinafter, the WSA may be also referred to as service advertisement information. The WSA is an application may provide information including announcement of availability of an application-service. A WSA message may identify and describe an application service and a channel in which the service is accessible. In an embodiment, the WSA may include a header, service information, channel information, and WAVE routing advertisement information.

Service advertisement information for service access may be a periodic message. In an embodiment, Co-operative Awareness Messages (CAM) may be periodic messages. The CAM may be broadcasted periodically by a facilities layer. In an embodiment, the CAM may also be transmitted by the RSU, and in such a case, the CAM may be transmitted and received in an RSU interval hereinafter.

Decentralized Environmental Notification Messages (DENM) may be event messages. The event message may be triggered by detection of the event to be transmitted. Service messages may be transmitted to manage a session. In the following embodiments, the event message may include a security message/information. The service message may include a non-safety message/information.

A V2X communication device may broadcast a cooperative awareness message (CAM) or a decentralized environmental notification message (DENM).

The CAM is distributed in an ITS network, and provides information for at least one of the presence, location or communication state of an ITS station. The DENM provides information for a detected event. The DENM may provide information for a given driving situation or event detected by an ITS station. For example, the DENM may provide information for a situation, such as an emergency electronic brake lamp, a traffic accident, a vehicle problem, or a traffic condition.

FIG. 4 illustrates a channel coordination mode of multi-channel operation according to an embodiment of the present disclosure.

FIG. 4 illustrates one of channel coordination modes of multi-channel operation: (a), (b) continuous mode, (c) altering mode, (d) extended mode, and (e) immediate mode. The channel coordination mode may indicate a method for accessing a CCH and an SCH by a V2X device.

A V2X device may access at least one channel. As an embodiment, a single-radio device may monitor a CCH and exchange data via an SCH. To this purpose, a channel interval has to be specified, where FIG. 4 illustrates the channel interval, namely, time slot allocation. Radio channel altering may be operated based on an interval synchronized in association with a common time base. A sync interval may include a plurality of time slots. And a plurality of time slots may correspond to a CCH interval and an SCH interval. In this case, a sync interval may include a CCH interval and an SCH interval. During the CCH interval, traffic may be exchanged via the CCH. A single-radio device participating in an application service may switch to the SCH during the SCH interval. Each of the CCH interval and the SCH interval may include a guard interval. Each interval may start as a guard interval.

As an embodiment, exchange of multi-channel operation information and safety-related service information may be performed via the CCH during the CCH interval. Also, negotiation for exchange of information between a service provider and a user may be performed via the CCH during the CCH interval. A hardware timing operation for channel altering of the V2X device may be initiated by a sync signal obtained from Coordinated Universal Time (UTC)-based estimation. Channel synchronization may be performed at 1 Pulse Per Second (PPS) intervals based on the UTC.

As an embodiment, FIG. 4 illustrates a channel coordination method of Multi-Channel Operation (MCO) described in the IEEE 1609.4, where two MAC layers perform time division on one physical layer to use a CCH and the respective channel modes in an alternate manner.

(a) & (b) Continuous mode: In the continuous mode, each vehicle or all the vehicles operate independently of a time division reference such as the time slot/CCH interval/SCH interval of FIG. 4. In the continuous mode, a V2X device may continuously receive operation information and safety-related service information of multi-channels from a specified CCH or SCH or may perform exchange of information between a service provider and a user.

(c) Altering mode: In the altering mode, each vehicle or all the vehicles may receive operation information and safety-related service/information of multi-channels or may perform a negotiation process for information exchange between a service provider and a user during the CCH interval. In the altering mode, each of all the vehicles performs a service/information exchange between the service provider and the user during the SCH interval. In the altering mode, a V2X device may perform communication via the CCH and the SCH in an alternate manner during configured CCH and SCH intervals.

(d) Extended mode: In the extended mode, communication during the CCH interval and the SCH interval may be performed as in the altering mode. However, service/information exchange during the SCH interval may also be performed during the CCH interval. As an embodiment, a V2X device in the extended mode may transmit and receive control information during the CCH interval; when the V2X device enters the SCH interval, it may maintain the SCH interval until service/information exchange is terminated.

(e) Immediate mode: In the immediate mode, a V2X device may perform communication as in the altering mode and/or extended mode. However, if negotiation for information exchange is completed during the CCH interval, a V2X device in the immediate mode may initiate information exchange by immediately performing channel switching to a specified SCH instead of waiting for the CCH interval to be terminated. As shown in FIG. 4, the extended mode and the immediate mode may be used together.

In the channel coordination modes of FIG. 4, management information of multi-channels and information exchange and negotiation for service provision may be performed only via the CCH during the CCH interval. Reception of safety-related service and information or negotiation for information exchange between a service provider and a user may also be performed only via the CCH during the CCH interval.

A guard interval may be included between the CCH interval and the SCH interval. A guard interval may secure time needed for synchronization when a communication device performs frequency change or channel change. At the time of channel change, hardware timer operation may be initiated by a sync signal obtained from Coordinated Universal Time (UTC)-based estimation. Channel synchronization may be performed at 1 Pulse Per Second (PPS) intervals by using the UTC as a reference signal.

As an embodiment, a sync interval may include the CCH interval and the SCH interval. In other words, one sync interval may include two time slots, and each of the CCH interval and the SCH interval may correspond to time slot 0 and time slot 1. The start of the sync interval may coincide with the start of the common time reference second. During one second, an integer multiple of the sync interval may be included.

A V2X device may perform communication by using the Multi-channel Operation (MCO) technique employing multi-antennas. As an embodiment, the ETSI MCO design specified in the ETSI TS 102 646-4-2 mainly considers the following objectives.

A Channel Access (CA) method that effectively uses channel resources in multi-channels by using multi-antennas should be provided.

A mechanism should be provided, which allows a V2X device to effectively listen to a Service Announcement Message (SAM) providing V2X service information and to switch to the corresponding announced service channel.

A mechanism should be provided, which minimizes the interference effect between adjacent channels occurred when the same vehicle performs V2X transmission and reception by using two or more multi-antennas and adjacent channels.

The Control Channel (CCH) is a reference channel to which traffic safety-related messages such as Cooperative Awareness Message (CAM), Decentralized Environmental Notification Message (DENM), Topology (TOPO), and MAP are transmitted. Other safety messages not fully transmitted to the CCH may be provided through the SCH. If a safety message of a new type is added, the additional safety message may be provided through the SCH.

The SAM announces a V2X service provided through the Service Channel (SCH), where the SAM may be provided through a well-known reference channel. For example, information on a V2X service provided in the ITS-G5A/B/D channel band may be provided through the SAM via a reference CCH. However, since provision of a V2X service through the CCH may affect provision of a safety message, the service may not be provided through the CCH. The information on a V2X service provided in each channel band may also be provided via an alternate reference SCH arbitrarily specified in the channel band through the SAM.

For the provision of various V2X services and a distribution of a V2X traffic load, the design of a multi-channel operation (MCO) method using a plurality of channels is in progress. In the multi-channel operation, methods for channel selection, channel management, and a channel operation in which a traffic load of each channel, quality of each channel, a provided service type, and priority are considered are important. In a single/multi-hop communication operation using multiple channels, various scenarios that require a channel selection/change may be expected. The channel selection/change may be performed in a vehicle or a road side unit (RSU).

Safety/non-safety service provision-related channel selection may be required. If a primary channel having high priority/designated channel is present with respect to a correspond service, a V2X communication device may preferentially select the primary channel as a default channel. A designated primary channel may not be present with respect to a service. If a designated primary channel is not present with respect to a service, a V2X communication device may perform channel selection because a default channel is not present with respect to the service for which a primary channel has not been defined. In this case, a channel initially selected for the service may be considered as the primary channel. In the present disclosure, a primary channel means a channel previously designated for service provision. A secondary channel is an available channel other than a primary channel and means a channel that has not been previously designated for service provision.

A safety/non-safety service provision-related channel change may be required. If a primary channel is present for a corresponding service, the primary channel is preferentially selected and used, but there may be a case where a channel change is necessary because the channel is congested or a secondary channel having a better transmission environment is present. Furthermore, a changed secondary channel is used, and there may be a case where the channel is congested or a channel change into a secondary channel having a better transmission environment is necessary. Furthermore, there may be a case where the channel is congested or a channel change into the primary channel having a better transmission environment again is necessary. If a primary channel is not present for a corresponding service, there may be a case where a channel change into a secondary channel is necessary because the state of a channel that is preferentially selected and used becomes congested.

The present disclosure proposes a multi-channel operation method based on service priority. In particular, the channel operation method of the present disclosure includes a channel selection operation and a priority adjustment method after channel selection. Each of the operations is performed by considering CBR information for multiple channels and priority information of a service.

FIG. 5 illustrates logical blocks of a multi-channel operation method according to an embodiment of the present disclosure.

As in FIG. 5, the channel operation method of the present disclosure may be performed by a channel selection block 5010, a channel access priority control block 5020, and a channel selection/change decision block 5030. Operations of the blocks of FIG. 5 may be performed by a V2X communication device or a processor thereof.

The channel selection operation of the channel selection block 5010 may be performed as in the following description.

The channel selection block 5010 may select an available channel group having a CBR for multiple channels, which is lower than an average CBR. In other words, the channel selection block 5010 may select channels having a threshold value or less. Such channels may be denoted as an available channel group.

For a channel selection and change operation, a channel candidate group may be additionally selected from the selected available channel group depending on a channel candidate group selection process. As an embodiment, the channel candidate group selection process may include selecting one channel candidate group from at least one channel candidate group that is differently defined based on service priority. As an embodiment, each channel candidate group in a set of channel candidate groups may be classified based on a channel congestion level. The channel congestion level may be defined using CBR information. A set of a plurality of channels candidate groups may become the channel candidate group. Each channel candidate group may be defined by sub-grouping, channels belonging to an available channel group, according to a proper rule. In this case, channels included in each channel candidate group may not overlap.

The channel selection block 5010 may select one reference channel from the selected channel candidate group. The reference channel may correspond to a primary channel or a secondary channel. The reference channel may mean a transmission channel.

Channel access priority control of the channel access priority control block 5020 may be performed as in the following description.

If a service is provided in a secondary channel, channel access priority may be controlled in the direction in which channel access priority of a contention-based channel access method; enhanced distributed channel access (EDCA) is lowered. A method of applying an access category (AC) parameter having low priority by a virtual change of user priority prior to a message input to a queue may be used as a channel access priority control method.

An operation of the channel selection/change decision block 5030 may be performed as in the following description.

The channel selection/change decision block 5030 may determine whether a primary channel is present for a provided service. If the primary channel is present, the primary channel is selected as a default channel. If the primary channel is not present, a secondary channel may be selected. With respect to a service for which a primary channel is not present, an initially selected channel may be considered as the primary channel. If it is determined that there is a problem in smooth service provision because a busy channel is congested, a channel change may be determined.

A multi-channel operation and a data transmission method of the present disclosure are more specifically described below.

Upon channel selection/change, multi-channel information may be required. Channel busy ratio (CBR) information for multiple channels may be required as multi-channel information. CBR information is traffic load state information defined as a busy period versus a monitoring period ratio of a channel. The CBR information may be used to determine a channel busy state for vehicles within the same network. The channel busy ratio (CBR) information may indicate a time-dependent value of 0 or more to 1 or less indicative of a fraction of the time for which a corresponding channel is busy. A CBR threshold value for determining whether a channel is available may be defined by considering priority of a service.

A multi-channel information acquisition method may be considered. Multiple receivers (e.g., a single transmitter+ multiple receivers, multiple transmitters+multiple receivers) may be used. CBR information for multiple channels may be obtained through multiple receivers. A V2X communication device may obtain CBR information for each channel by scanning multiple channels for a given time interval. Multi-channel information may be obtained through cooperation communication between surrounding vehicles. That is, CBR information for multiple channels may be obtained using channel information measured in an ego-vehicle and channel information measured and shared by a surrounding vehicle.

Hereinafter, according to an embodiment of the present disclosure, a method of operating multiple channels using CBR information and service priority in a single/multi-hop multiple channels V2X system within the same network is described.

FIG. 6 illustrates an operation structure between layers for channel selection according to an embodiment of the present disclosure.

A management entity (Management; 6010) may calculate and obtain CBR information, may select a channel, and may transmit the calculated channel information to the outside. A metric evaluation block 6030 may calculate CBR_E using CBR_I and CRB_G. A channel selection block 6020 may select a channel based on a metric evaluation result. The metric evaluation block 6030 may belong to the management entity 6010. The metric evaluation block 6030 may estimate and evaluate a channel state using the channel information CBR_I measured from an ego-vehicle and the channel information CBR_g collected from a surrounding vehicle.

As an embodiment, the metric evaluation block 6030 may obtain a CBR using a method, such as CBR estimation using an average, CBR estimation using an adaptive algorithm, or CBR estimation using a min-max algorithm.

A description of parameters related to an operation of each of the blocks illustrated in FIG. 6 is as follows.

CBR_l(local CBR): CBR information measured from an ego-vehicle

CBR_g(Global CBR): CBR information measured and shared by a surrounding vehicle

CBR_e(estimated CBR): estimation CBR information calculated using CBR_l and CBR_g Neighbor's link information: neighbor's link information is CBR information measured in a surrounding vehicle. The neighbor's link information may be shared through the network header of a network/transport layer.

Link monitoring block 6040: the link monitoring block may belong to an access layer. The link monitoring block may monitor data traffic or beaconing traffic provided using a corresponding channel during a given estimation window period.

Link measurement block 6050: the link measurement block may belong to the access layer. The link measurement block may obtain time stamp information or sequence number information on which a channel state may be checked from a packet received for link monitoring, or may measure a CBR or received signal strength indication (RSSI) information.

The management entity 6010 of FIG. 6 may further include a channel access priority control block. The channel access priority control block may control channel access priority if a service is provided by a secondary channel not a designated primary channel. The channel access priority control block may virtually change user priority before a message is input to a queue located in the MAC layer, and may transmit the message to a changed queue.

Operations of the blocks illustrated in FIG. 6 may be performed by the processor of a V2X communication device.

Hereinafter, channel selection for single/multi-hop V2X communication of the V2X communication device using multiple channels is described. CBR information may be periodically and/or consistently updated. CBR information may be measured using multiple reception antennas or may be obtained using shared information from a surrounding vehicle. Hereinafter, a method (step-1) of selecting an available channel group using multi-channel CBR information, a method (step-2) of primarily selecting a channel candidate group from the selected available channel group using multi-channel CBR information and priority information, and (step-3) of selecting a reference channel from the channel candidate group is described.

<Step-1> Selection of Available Channel Group Having CBR Lower than Average CBR for Multiple Channels The selection of an available channel group that is preferentially performed may be performed prior to channel candidate group selection in order to guarantee load balancing between channels. A V2X communication device may select a channel so that each channel identically has the same CBR by selecting a channel having a CBR value lower than an average CBR value with respect multiple channels. Accordingly, load balancing, that is, a distribution of a channel load, can be secured.

An average CBR value for multiple channels necessary for CBR threshold value setting may be instantaneously calculated for each specific time or may be calculated through an adaptive algorithm using an instantaneously calculated CBR value as follows.

The average CBR calculated instantaneously may be calculated as in Equation 1 below.

$$C\dot{B}R(n) = \left(\frac{1}{N}\right)\sum_i CBRi(n):$$ [Equation 1]

In Equation 1, N indicates the number of available channels. CBRi(n) indicates a CBR value measured in an i-th channel for an n-th time slot. The time slot indicates a window period for channel monitoring. CBRi(n) may be instantaneously calculated. Furthermore, CBRi(n) may be calculated using CBR information (e.g., . . . , CBRi(n−2), CBRi(n−1)) calculated in a previous time slot.

The average CBR using the adaptive algorithm may be calculated as in Equation 2 below.

$$\overline{CBR}(n) = \alpha C\dot{B}R(n) + (1-\alpha)\overline{CBR}(n-1)$$ [Equation 2]

In Equation 2, $\alpha(0<\alpha\leq1)$ indicates a forgetting factor of the adaptive algorithm. An average CBR calculated by applying the adaptive algorithm may be periodically updated using the average CBR value CBR(n) instantaneously calculated.

<Step-2> Selection of Channel Candidate Group from Available Channel Group in Step-1

A channel candidate group may be selected from an available channel group by a channel candidate group selection process. A detailed operation of the channel candidate group selection process, a method of selecting a channel candidate group based on service priority, and a channel congestion level are described later.

<Step-3> Selection of One Reference Channel from Channel Candidate Group Selected in Step-2

A primary channel or a secondary service channel may become a reference channel.

As a case where a channel change is necessary in a secondary channel in which a service is provided, if the channel candidate group selected in step-2 includes a primary channel, the primary channel may be selected as a reference channel. In this case, the service has a designated primary channel, or in the case of a service whose primary channel has not been designated, an initially selected channel may be considered as a primary channel.

If a channel included in the channel candidate group selected in step-2 does not include a primary channel for a service or a primary channel is not present for a channel selection target service, one secondary channel may be selected.

1) In this case, one secondary channel may be randomly selected.

2) A secondary channel capable of minimizing interference that affects a high priority channel (e.g., a control channel (CCH), safety channel)) may be selected.

FIG. 7 illustrates a secondary channel selection method according to an embodiment of the present disclosure.

As an embodiment of FIG. 7, a channel candidate group may include three channels SCH-176, SCH-182, and SCH-184. In order to minimize interference with major services provided through a CCH, a channel having a maximum distance between frequencies from the CCH among channels included in the channel candidate group may be selected.

In the example of FIG. 7, the No. 184 service channel SCH-184 among the channels included in the channel candidate group has the longest distance between frequencies from a control channel CCH-178. Accordingly, the No. 184 service channel SCH-184 among the three channels included in the channel candidate group may be selected as a reference channel. In the present disclosure, a reference channel may correspond to a transmission channel selected when a signal is transmitted.

Hereinafter, a channel selection process proposed for the channel candidate group selection of <step-2> is described. Hereinafter, 1) a channel congestion level is defined, 2) a method of mapping a channel candidate group, classified based on the congestion level, based on service priority is described, and 3) a channel candidate group selection process operation is described.

FIG. 8 illustrates a channel classification method based on a channel congestion level according to an embodiment of the present disclosure.

A channel congestion level means a criterion for determining a congestion level of a channel using a CBR value measured and obtained in each channel.

In the embodiment of FIG. 8, the channel congestion level may be defined as four levels (Congestion Level-0, Congestion Level-1, Congestion Level-2, and Congestion Level-3). The channel congestion level may be defined as the four levels as in the embodiment of FIG. 8 by considering four service priorities of ITS-G5/IEEE 802.11p.

As in the embodiment of FIG. 8(a), the channel congestion level may be defined as the congestion level-0 when a CBR belongs a range of $0.00 \leq CBR < 0.25$, may be defined as the congestion level-1 when a CBR belongs to a range of $0.25 \leq CBR < 0.50$, may be defined as the congestion level-2 when a CBR belongs to a range of $0.50 \leq CBR < 0.75$, and may be defined as the congestion level-3 when a CBR belongs to a range of $0.75 \leq CBR < 1.00$. In the embodiment of FIG. 8(b), the channel congestion level may be defined as the congestion level-0 when a CBR belongs to a range of $0.00 \leq CBR < 0.15$, may be defined as the congestion level-1 when CBR belongs to a range of $0.15 \leq CBR < 0.30$, may be defined as the congestion level-2 when a CBR belongs to a range of $0.30 \leq CBR < 0.40$, and may be defined as the congestion level-3 when a CBR belongs to a range of $0.40 \leq CBR < 1.00$. The channel congestion level may be defined as another period or the number of levels different from those in the embodiment of FIG. 8. For example, with respect to CBR values between 0 and 1, three channel congestion levels may be defined or five channel congestion levels may be defined. A value, that is a reference for each channel level, may be differently determined depending on an embodiment. The channel congestion level may be variably determined based on a system situation, a channel situation, etc.

As an embodiment, a channel candidate group may be classified depending on a channel congestion level. Channels corresponding to a CBR of the congestion level-0 may be mapped as a channel candidate group-0, channels corresponding to a CBR of the congestion level-1 may be mapped as a channel candidate group-1, channels corresponding to a CBR of the congestion level-1 may be mapped as a channel candidate group-1, and channels corresponding to a CBR of the congestion level-3 may be mapped as a channel candidate group-3. In this case, the congestion level may not correspond to the channel candidate group in a 1:1 manner. The congestion level may correspond to the channel candidate group in a 1:1, n:1 or 1:n manner depending on the type and priority of service.

Hereinafter, a method of classifying a channel candidate group based on service priority is described. That is, if an available channel group having a CBR value for multiple channels smaller than an average CBR value is determined, the number of channel candidate groups and the size of each channel candidate group may be determined based on priority of a provided service.

FIG. 9 illustrates a method of configuring channel candidate groups in which service priority is considered according to an embodiment of the present disclosure.

The embodiment of FIG. 9 illustrates a channel candidate group classification method based on service priority if four channel congestion levels are defined as in FIG. 8. In the embodiment of FIG. 9(a), the channel congestion levels may be assigned as in the embodiment of FIG. 8(b). That is, a channel congestion level may be defined as a congestion level-0 when a CBR belongs to a range of 0.00≤CBR<0.15, may be defined as a congestion level-1 when a CBR belongs to a range of 0.15≤CBR<0.30, may be defined as a congestion level-2 when a CBR belongs to a range of 0.30≤CBR<0.40, and may be defined as a congestion level-3 when a CBR belongs to a range of 0.40≤CBR<1.00. FIG. 9(b) illustrates an embodiment of a channel candidate group classification method for a high priority (HP) service. FIG. 9(c) illustrates an embodiment of a channel candidate group classification method for a medium priority-1 (MP-1) service. FIG. 9(d) illustrates an embodiment of a channel candidate group classification method for a medium priority-2 (MP-2) service. FIG. 9(e) illustrates an embodiment of a channel candidate group classification method for a low priority (LP) service.

The embodiments of FIGS. 9(b) to 9(e) illustrate methods of mapping/configuring channel candidate groups, classified into congestion levels based on CBR values, based on service priorities again.

FIG. 9(b) illustrates a channel candidate group configuration method for a high priority (HP) service.

FIG. 9(b) illustrates a method of classifying a channel candidate group when priority of a provided service is the highest. In FIG. 9(b), a channel candidate (CC)-0 may correspond to a range in which a CBR value measured in a channel is a congestion level-0. That is, when a CBR value belongs to a range of 0.00≤CBR<0.15, a corresponding channel belongs to a CC-0 channel candidate group. Similarly, a CC-1 may correspond to a range in which a CBR value is a congestion level-1. A CC-2 may correspond to a range in which a CBR value is a congestion level-2. A CC-3 may correspond to a range in which a CBR value is a congestion level-3.

FIG. 9(c) illustrates a channel candidate group configuration method for a service in which priority is the first middle priority (MP-1).

FIG. 9(c) illustrates a method of classifying a channel candidate group when priority of a provided service is the MP-1. In FIG. 9(c), a channel candidate (CC)-0 may correspond to the sum of a range in which a CBR value measured in a channel is a congestion level-0 and a range in which a CBR value measured in a channel is a congestion level-1. That is, if a CBR value belongs to a range of 0.00≤CBR<0.30, a corresponding channel belongs to a CC-0 channel candidate group. Similarly, a CC-1 may correspond to a range in which a CBR value is a congestion level-2. A CC-2 may correspond to a range in which a CBR value is a congestion level-3.

FIG. 9(d) illustrates a channel candidate group configuration method for a service in which priority is a second middle priority (MP-2).

FIG. 9(d) illustrates a method of classifying a channel candidate group when priority of a provided service is MP-2. In FIG. 9(d), a channel candidate (CC)-0 may correspond to a range in which a CBR value measured in a channel is a congestion level-0, a range in which a CBR value measured in a channel is a congestion level-1, and a range in which a CBR value measured in a channel is a congestion level-3. That is, if a CBR value belongs to a range of 0.00≤CBR<0.40, a corresponding channel belongs to a CC-0 channel candidate group. Similarly, a CC-1 may correspond to a range in which a CBR value is a congestion level-3.

FIG. 9(e) illustrates a channel candidate group configuration method for a service whose priority is low priority (LP).

FIG. 9(e) illustrates a method of classifying a channel candidate group when priority of a provided service is the lowest. In FIG. 9(e), only one channel candidate group may be defined. That is, in FIG. 9(e), a channel candidate (CC)-0 is defined. A CBR value measured in a channel may correspond to the sum of a range in which the CBR value is a congestion level-0, a range in which the CBR value is a congestion level-1, a range in which the CBR value is a congestion level-2, and a range in which the CBR value is a congestion level-3. That is, if a CBR value belongs to a range of 0.00≤CBR<1.00, a corresponding channel belongs to a CC-0 channel candidate group.

As described above, the number of channel candidate groups within a channel candidate group and the size of each channel candidate group may be differently defined based on priority of a provided service. A channel candidate group may be configured so that a probability that a channel having a low channel congestion level will be selected as service priority becomes higher can be increased.

FIG. 10 illustrates a channel candidate group selection process according to an embodiment of the present disclosure.

In FIG. 10, a case where a channel candidate group CC-1 to a channel candidate group CC-n are defined within a channel candidate group is assumed. In FIG. 10, a V2X communication device sequentially determines whether a channel candidate group is present, and may select a channel candidate group from which a reference channel is selected if the channel candidate group is present.

As described above, the V2X communication device may determine a valid channel candidate group based on a CBR threshold value. That is, the V2X communication device may select channels each having a CBR value smaller than or equal to the CBR threshold value. Furthermore, as in FIG. 10, the V2X communication device may sequentially determine whether a channel candidate group to which selected channels belong is present. As in FIG. 10, whether a channel candidate group to which selected channels belong is present is sequentially determined from a channel candidate group having a small CBR covered by a CBR window. Accordingly, a channel candidate group having the lowest CBR covered by a CBR window among at least one channel candidate group is selected with respect to selected channels.

For example, an average CBR value of a multi-channel is 0.5, and a channel A having a CBR of 0.1 and a channel B having a CBR of 0.25 may be selected as an available channel group. In the case of FIG. 9(b) in which priority of a service is the HP, a channel candidate group-0 to which the channel A belongs is present. Accordingly, the channel A may be selected as a data transmission channel. In the case of FIG. 9(b) in which service priority is the MP-1, in the case of FIG. 9(c) in which service priority is the MP-2, and in the case of FIG. 9(d) in which service priority is the LP, a channel candidate group-0 to which the channel A and the channel B belong is present. Accordingly, the channel A or channel B may be selected as a data transmission channel.

Hereinafter, a method of adjusting priority for channel access prior to channel switching into a selected channel after one reference channel is selected by a channel selection operation is described. That is, if a service is provided in a secondary channel not a designated primary channel, a method using user priority and an access category (AC) correspondence table in EDCA in order to lower priority for channel access is described. A method defined in IEEE 802.11 may be applied to EDCA.

Table 1 illustrates user priority and the AC correspondence table in EDCA according to an embodiment of the present disclosure.

TABLE 1

| User priority | AC | CWmin | CWmax | AIFS |
|---|---|---|---|---|
| 1,2 | BackGround (AC_BK) | 31 | 1023 | 7 |
| 0,3 | Best Effort (AC_BE) | 31 | 1023 | 3 |
| 4,5 | Video (AC_VI) | 15 | 31 | 2 |
| 6,7 | Voice (AC_VO) | 7 | 15 | 2 |

Table 1 is an embodiment of transmission priorities for eight services defined in an EDCA operation. MAC transmission scheduling may be differently set based on service characteristics. In EDCA, MAC transmission scheduling may be performed by parameter {CWmin(AC), CWmax(AC), AIFS(AC)} control. Scheduling for channel access may be controlled through parameter setting. Arbitration inter-frame spacing (AIFS) indicates a period in which a communication apparatus waits before next frame transmission is permitted. A shorter AIFS period may means that a message is transmitted at a higher probability with lower latency.

In the embodiment of Table 1, the priorities of the four services are high in order of Voice(AC_VO), Video (AC_VI), Best Effort(AC_BE), and BackGround(AC_BK). As the priority of a service becomes higher, the time for which a V2X communication device waits before transmitting a service/message/packet is set to be short. Accordingly, a service having high priority has a more transmission opportunity than a service having low priority.

FIG. 11 illustrates an EDCA queue structure of a MAC layer of a V2X communication device according to an embodiment of the present disclosure.

In FIG. 11, AC0 to AC3 may correspond to AC_VO, AC_VI, ACBE, and AC_BK of Table 1, respectively. As an embodiment, a service/message having one priority among AC_VO, AC_VI, ACBE, and AC_B may be transmitted to a queue of the MAC layer having AC corresponding to correspond priority in the layer. A service/message stored in each queue may be transmitted after a CSMA/CA operation using an access parameter for each AC defined in Table 1. Carrier-sense multiple access with collision avoidance (CSMA/CA) indicates an operation of sensing whether a corresponding channel is idle before a V2X communication device transmits a signal in a channel.

FIG. 12 illustrates an EDCA queue control method of the MAC layer of the V2X communication device according to an embodiment of the present disclosure.

FIG. 12 illustrates an embodiment in which a service having a channel access priority AC0 is transmitted in a secondary channel not a primary channel. A specific service may be transmitted in a secondary channel not a primary channel based on a channel situation or the aforementioned channel selection method. For example, the primary channel of a service A may be a 172 channel, and the secondary channel thereof may be a 174 channel. Furthermore, the service A may be transmitted in the 174 channel. In this case, the 174 channel may be the primary channel of the service B. In this case, if the service A is transmitted with the top priority even in the 174 channel, latency may be caused in the transmission of the service B. Accordingly, if a specific service is transmitted in a secondary channel, priority may need to be adjusted.

In the embodiment of FIG. 12, a service in which AC0 corresponded to priority in a primary channel is input to a queue having lower priority than AC0 in a secondary channel, and is transmitted based on an EDCA transmission parameter of the corresponding queue. That is, transmission data, that is, the priority of AC0 may be assigned to one queue of AC1 to AC3. Such virtual switching/assignment of priority may be determined based on the aforementioned CBR level or congestion level. For example, if a CBR of a switched channel corresponds to a congestion level-0, transmission priority of a service virtually switches to one-step lower priority, and transmission data is input to a corresponding queue. That is, a service of AC0 may be input to the queue of AC1. If a CBR of a switched channel corresponds to a congestion level-1, transmission priority of a service may virtually/temporarily switch to two-step lower priority. That is, service data of AC0 may be input to the queue of AC2. In this case, the queue of AC3 may be input to the queue of AC3 regardless of a primary channel/secondary channel, and may be transmitted based on an EDCA transmission parameter of the corresponding queue.

In the present disclosure, a multi-channel selection and channel change decision method may be performed as follows.

If a designated primary channel is present for a provided service, the corresponding channel may be selected as a preset channel. If a corresponding primary channel is included in a channel candidate group, the corresponding primary channel may be selected.

If a designated primary channel is not present for a provided service, a given channel may be selected through a channel selection process. Thereafter, the selected channel may be set as a primary channel. Thereafter, if a designated primary channel is included in the channel candidate group, the corresponding channel may be selected.

Whether to perform a channel change from a busy channel to another channel may be determined as follows.

If a busy channel exceeds an allowable channel congestion level, a channel change may be performed. In this case, a channel congestion level may be set as a specific value regardless of service priority. For example, when a CBR value measured in a busy channel exceeds a CBR threshold value (e.g., 0.65) to determine whether to change a channel, a channel change may be performed. In this case, when a CBR measured in other channels except the busy channel exceeds the CBR threshold value to determine whether to change a channel, a channel change may not be performed. A CBR threshold value to determine a channel congestion level in a channel in which a service is provided and a CBR threshold value to determine whether to change a channel may be the same or different.

When a busy channel has a CBR value exceeding an average CBR of multiple channels, a channel change may be performed. The average CBR of the multiple channels may be periodically updated and set. In this case, when a CBR measured in a surrounding channel is equal to the CBR of the busy channel or a difference between the channels is within a specific CBR margin (e.g., CBR margin<0.1), a channel change may not be performed.

When a busy channel exceeds an allowable channel congestion level, a channel change may be performed. The channel congestion level may be differently configured/defined based on service priority. In this case, when channel congestion levels of other channels other than the busy channel exceeds the allowable channel congestion level, a channel change may not be performed.

FIG. 13 illustrates the V2X communication device according to an embodiment of the present disclosure.

In FIG. 13, the V2X communication device 13000 may include a communication unit 13010, a processor 13020, and a memory 13030. As described above, the V2X communication device may correspond to an on board unit (OBU) or a road side unit (RSU) or may be included in an OBU or RSU. The V2X communication device may be included in an ITS station or may correspond to an ITS station.

The communication unit 13010 is connected to the processor 13020 and may transmit/receive a radio signal. The communication unit 13010 may up-convert data, received from the processor 13020, into a transmission or reception band, and may transmit a signal. The communication unit may implement an operation of the access layer. In an embodiment, the communication unit may implement an operation of the physical layer included in the access layer or may additionally implement an operation of the MAC layer. The communication unit may include a plurality of sub-communication units in order perform communication according to a plurality of communication protocols.

The processor 13020 is connected to the communication unit 13010 and may implement operations of layers according to an ITS system or a WAVE system. The processor 13020 may be configured to perform operations according to the aforementioned various embodiments of the disclosure according to the drawings and description. Furthermore, at least one of a module, data, a program or software that implements an operation of the V2X communication device 13000 according to the aforementioned various embodiments of the disclosure may be stored in the memory 13030 and executed by the processor 13020.

The memory 13030 is connected to the processor 13020 and stores various data/information for driving the processor 13020. The memory 13030 is installed inside the processor 13020 or outside the processor 13020, and may be connected to the processor 13020 by known means. The memory may include a security/non-security storage device or may be included in a security/non-security storage device. In some embodiments, the memory may be referred to as a security/non-security storage device.

A detailed configuration of the V2X communication device 13000 in FIG. 13 may be implemented so that various embodiments of the disclosure are independently applied or two or more of the embodiments are applied together.

In the embodiment of the present disclosure, the communication unit may include at least two transceivers. The communication unit may include a transceiver performing communication according to a WLAN V2X communication protocol based on Institute of Electrical and Electronics Engineers (IEEE) 802.11 and a transceiver performing communication according to a cellular V2X communication protocol based on Evolved Universal Terrestrial Access (LTE/E-UTRA) of 3rd Generation Partnership Project (3GPP) or a 5G new radio (NR). As in ITS-G5, the transceiver performing communication according to the WLAN V2X communication protocol may be called a WLAN transceiver. The transceiver performing communication according to a cellular communication protocol, such as the NR, may be called a cellular transceiver.

FIG. 14 is a flowchart illustrating a multi-channel transmission method of the V2X communication device according to an embodiment of the present disclosure.

The V2X communication device may obtain CBR information for a plurality of channels (S14010).

CBR information measured by the V2X communication device or a vehicle on which the V2X communication device is mounted may be used to obtain CBR information for a plurality of channels. The CBR information may correspond to a CBR value. Furthermore, CBR information for at least one channel shared by a surrounding vehicle or a surrounding V2X communication device may be used to obtain CBR information for a plurality of channels. The V2X communication device may obtain CBR information for multiple channels using CBR information measured in an ego-vehicle and CBR information shared by a surrounding vehicle.

The V2X communication device may set a CBR threshold value (S14020).

As in the aforementioned equations, the CBR threshold value may correspond to an average value of CBR values of a plurality of channels, and the average value may be calculated instantaneously or adaptively. The CBR threshold value may correspond to a corrected average value or may correspond to an average value to which a weight has been applied. Priority may be incorporated into the CBR threshold value. That is, if the CBR threshold value is calculated by applying the weight to the average value, priority of a service to which transmission data corresponds may be incorporated into the weight.

The V2X communication device may assign a channel candidate group (S14030).

The V2X communication device may assign, as at least one channel candidate group, channels having a CBR value smaller than or equal to the CBR threshold value. The channels having a CBR value smaller than or equal to the CBR threshold value may be referred to as candidate channels. The V2X communication device may assign the candidate channels as the channel candidate group configured as in FIGS. 8 and 9. The channel candidate group may be determined based on a channel congestion level for a service.

As described in relation to FIG. 9, the number of at least one channel candidate group and a CBR window covered by each channel candidate group may be differently set depending on service priority of service data. That is, as the service priority becomes higher, the number of channel candidate groups may be increased, and a CBR window covered by a channel candidate group may be narrowed. As the service priority becomes lower, the number of channel candidate groups may be reduced, and a CBR window covered by a channel candidate group may be widened. As a result, a probability that a channel having a small CBR will be assigned to a service having high priority will be increased.

The V2X communication device may select a transmission channel from the channel candidate group (S14040)

The step of selecting the transmission channel may further include the step of selecting a channel candidate group, having the lowest CBR covered by the CBR window, among at least one channel candidate group and the step of selecting the transmission channel among channels included in the selected channel candidate group.

The channel candidate group may be selected from a channel candidate group having the lowest CBR covered, as described with reference to FIGS. 8 to 10.

The V2X communication device may transmit data to one channel randomly selected from channels included in the channel candidate group. Furthermore, the transmission channel may be selected by considering priority of a channel. As in the embodiment of FIG. 7, a secondary channel capable of minimizing interference with a primary channel may be selected.

If the service data is transmitted in a secondary channel not a primary channel for the service, the V2X communication device may temporarily change priority for queue assignment to the service data as described with reference to FIGS. 11 and 12. That is, if the service data is transmitted in a secondary channel not a primary channel for a service, the service data may be input/stored in a queue corresponding to an access category lower than an access category assigned to a corresponding service.

The V2X communication device may change a transmission channel based on an allowable channel congestion level or a threshold value of CBR values for the plurality of channels.

The embodiments described above are combinations of constituting elements and features of the present disclosure in a predetermined form. Each individual element or feature has to be considered as optional except where otherwise explicitly indicated. Each individual element or feature may be implemented solely without being combined with other elements or features. Also, it is also possible to construct the embodiments of the present disclosure by combining a portion of the elements and/or features. A portion of a structure or feature of an embodiment may be included in another embodiment or may be replaced with the corresponding structure or feature of another embodiment. It should be clearly understood that the claims which are not explicitly cited within the technical scope of the present disclosure may be combined to form an embodiment or may be included in a new claim by an amendment after application.

The embodiments of the present disclosure may be implemented by various means such as hardware, firmware, software, or a combination thereof. In the case of hardware implementation, one embodiment of the present disclosure may be implemented by using one or more of ASICs (Application Specific Integrated Circuits), DPSs (Digital Signal Processors), DSPDs (Digital Signal Processing Devices), PLDs (Programmable Logic Devices), FPGAs (Field Programmable Gate Arrays), processors, controllers, micro-controllers, and micro-processors.

In the case of implementation by firmware or software, one embodiment of the present disclosure may be implemented in the form of modules, procedures, functions, and the like which perform the functions or operations described above. Software codes may be stored in the memory and activated by the processor. The memory may be located inside or outside of the processor and may exchange data with the processor by using various well-known means.

It is apparent for those skilled in the art that the present disclosure may be embodied in other specific forms without departing from the essential characteristics of the present disclosure. Therefore, the detailed descriptions above should be regarded as being illustrative rather than restrictive in every aspect. The technical scope of the present disclosure should be determined by a reasonable interpretation of the appended claims, and all of the modifications that fall within an equivalent scope of the present disclosure belong to the technical scope of the present disclosure.

MODE FOR INVENTION

It should be clearly understood by those skilled in the art that the present disclosure may be changed or modified in various ways without departing from the technical principles and scope of the present disclosure. Therefore, it is intended that the present disclosure includes changes and modifications of the present disclosure defined by appended claims and provided within their equivalent scope.

The present disclosure describes both of the apparatus disclosure and the method disclosure, and descriptions of the respective disclosures may be applied in a supplementary manner.

Various embodiments have been described in their best mode for implementing the present disclosure.

INDUSTRIAL APPLICABILITY

The present disclosure is used in a series of vehicle communication applications.

It should be clearly understood by those skilled in the art that the present disclosure may be changed or modified in various ways without departing from the technical principles and scope of the present disclosure. Therefore, it is intended that the present disclosure includes changes and modifications of the present disclosure defined by appended claims and provided within their equivalent scope.

The invention claimed is:

1. A method of transmitting data by a communication device comprising:
    obtaining CBR (channel busy ratio) values for a plurality of channels;
    setting a CBR threshold value based on the CBR values;
    generating at least one channel candidate group based on the CBR threshold value;
    transmitting the data through a channel included in the at least one channel candidate group,
    wherein each of the at least one channel candidate group includes at least one channel,
    wherein as a service priority becomes higher, the number of channel candidate groups is increased and a CBR window covered by the channel candidate group is narrowed, and wherein as the service priority becomes lower, the number of channel candidate groups is decreased and the CBR window covered by the channel candidate group is widened, and
    wherein the CBR window is a range of the CBR values determined based on at least one congestion level.

2. The method of claim 1, wherein transmitting the data through a channel included in the at least one channel candidate group includes:
    selecting, from the at least one channel candidate group, a channel candidate group having a lowest CBR covered by the CBR window; and
    selecting the channel among channels selected in the channel candidate group.

3. The method of claim 1, wherein based on the data being transmitted in a secondary channel not a primary channel for the service, priority for queue assignment to the data is temporarily changed.

4. The method of claim 1, wherein based on the data being transmitted in a secondary channel not a primary channel for the service, the service data is input to a queue related to an access category lower than an access category assigned to the service.

5. The method of claim 1, wherein the channel candidate group is determined based on the channel congestion level for the service.

6. The method of claim 1, wherein a change in the channel is determined based on an allowable channel congestion level or the threshold value of the CBR values for the plurality of channels.

7. A communication device comprising:
a memory storing data;
a transceiver configured for transmitting and receiving radio signals; and
a processor configured to control the memory and the transceiver,
wherein the processor is further configured to:
obtain CBR (channel busy ratio) values for a plurality of channels,
set a CBR threshold value based on the CBR values,
generate at least one channel candidate group based on the CBR threshold value,
transmit data through a channel included in the at least one channel candidate group,
wherein each of the at least one channel candidate group includes at least one channel,
wherein as a service priority becomes higher, the number of channel candidate groups is increased and a CBR window covered by the channel candidate group is narrowed, and wherein as the service priority becomes lower, the number of channel candidate groups is decreased and the CBR window covered by the channel candidate group is widened, and wherein the CBR window is a range of the CBR values determined based on at least one congestion level.

8. The communication device of claim 7, wherein transmitting, by the processor, the data is performed by:
selecting, from the at least one channel candidate group, a channel candidate group having a lowest CBR covered by the CBR window; and
selecting the transmission channel among channels selected in the channel candidate group.

9. The communication device of claim 7, wherein based on the data being transmitted in a secondary channel not a primary channel for the service, priority for queue assignment to the service data is temporarily changed.

10. The communication device of claim 7, wherein based on the service data being transmitted in a secondary channel not a primary channel for the service, the service data is input to a queue related to an access category lower than an access category assigned to the service.

11. The communication device of claim 7, wherein the channel candidate group is determined based on the channel congestion level for the service.

12. The communication device of claim 7, wherein a change in the channel is determined based on an allowable channel congestion level or the threshold value of the CBR values for the plurality of channels.

* * * * *